Patented Jan. 24, 1950

2,495,521

UNITED STATES PATENT OFFICE 2,495,521

METHOD FOR THE PREPARATION OF HYDROQUINONE

Marcel Hannion and Igor Scriabine, Lyons, France, assignors, by mesne assignments, to Societe des Usines Chimiques Rhone-Poulenc, Paris, France No Drawing. Application October 22, 1945, Serial No. 623,892. In France December 8, 1941

Section 1, Public Law 690, August 8, 1946
Patent expires December 8, 1961

4 Claims. (Cl. 260—621).

Sabatier, passing quinone vapours mixed with hydrogen upon a length of catalyser (nickel or copper), obtained hydroquinone in good yields (Comptes rendus Ac. Sc., vol. 146, p. 457, 1908 and vol. 172, p. 733, 1921).

When it is attempted to extend this reaction, it is found that very rapidly the activity of the catalyser will decrease and finally become nul. This is due to a soiling of the catalyser, partly by the hydroquinone, which, unsufficiently volatile at the temperature best suited for hydrogenation, will deposit upon the catalyser, thereby gradually decreasing its conatct surface, and partly to tar substances setting up the same prejudicial state of affairs. For this reason, it has never been possible to carry out Sabatier's reaction on an industrial scale.

One means for decreasing the soiling of the catalyser consists in operating under higher temperatures, but this brings about a serious drawback, already observed by Sabatier himself (Bull. Soc. Chim. France, 4th series, vol. I, p. 860, 1907 and vol. 3, p. 83, 1908) : there are set up secondary products, benzene, cyclohexanol, quinite, phenol, etc., thereby quite seriously decreasing the yield.

Now, according to the invention it has been found that all these drawbacks could be avoided if the catalytic hydrogenation of the quinone is carried out in the presence of steam.

Under these conditions, it is possible to operate at temperatures giving the best ratio of transformation of quinone into hydroquinone, without pollution of the catalyser. The latter may thus serve for a very long time without any decrease of activity. The formation of disturbing under-products, and particularly phenol, is entirely avoided, even if the operation is carried out under higher temperature.

It is easy to obtain a quantitative transformation of the quinone into hydroquinone using substantially only the theoretical amount of hydrogen, while, when operating according to Sabatier, it is necessary to employ a large excess of said gas. Besides, it is surprising that both these advantages subsist even in the presence of large amounts of steam, such as 200 parts, or more, for one part of quinone.

The use of steam has further another advantage: condensing it partially after the reaction, it is possible to obtain directly a highly concentrated hydroquinone solution, from which the product may be crystallised by mere cooling.

In case the quinone to be hydrogenised is in solution in an organic solvent such as benzene, chlorbenzene, alcohol, etc., it is not necessary to separate it from the latter. The solution may be carried away with steam and the hydrogen-steam - quinone vapour - organic solvent vapour mixture passed over the catalyser. In this case, it is also very easy to separate the hydroquinone from the mixture after partial condensation.

The catalyser may be one of those commonly used for hydrogenation, such as nickel, cobalt, copper, either separately or in mixture with one another. It is advantageous to use these catalysers in granular state or as blocks with a good mechanical strength. For this, they may be mixed with cements or concretes, or one may use pieces of nickel-aluminum alloy attached superficially by an alkali.

The following, non limitative examples, describe a few manners for carrying the invention into practice. The parts indicated are in weight:

Example 1

Upon 450 parts of a catalyser constituted by active nickel and cement in the form of compact grains containing 60% Ni is passed, at a temperature of 240° C., a mixture of hydrogen, steam and quinone, at the rate of 16 parts of quinone,
500 parts of water, and
0.3 part of hydrogen per hour.

About 60 parts of steam are condensed per hour and a colourless aqueous solution obtained, containing about 225 g. of hydroquinone per litre. The remaining vapours, practically free from quinone and hydroquinone, may be used again for introducing a fresh amount of quinone into the circuit.

Example 2

Upon 300 parts of the catalyser described in Example 1 is passed, at a temperature of from 200 to 230° C., a mixture of:

55 parts of steam,
1 part of quinone vapour, and
10 parts of chlorbenzene vapour, at the rate of 10.5 parts of quinone per hour. At the same time is introduced 0.2 part of hydrogen per hour. By fractionated condensation of the vapours after hydrogenation, there may be obtained quantitatively pure hydroquinone in concentrated aqueous solution and, in a further fraction, chlorbenzene.

What we claim is:

1. A method for the preparation of hydroquinone, consisting in hydrogenating quinone in the vapor state by passing a gaseous mixture of hydrogen, steam and quinone vapor over a hydrogenation catalyst.

2. A method for the preparation of hydroquinone, consisting in hydrogenating quinone in the vapor state by passing a gaseous mixture of hydrogen, steam, quinone vapor and the vapor of an organic solvent for quinone over a hydrogenation catalyst.

3. A method for the preparation of hydroquinone, consisting in hydrogenating quinone in the vapor state by passing a gaseous mixture of hydrogen, steam, and quinone vapor over a hydrogenation catalyst, and partially condensing, after reaction, the steam with the hydroquinone formed.

4. A method for the preparation of hydroquinone, consisting in hydrogenating quinone in the vapor state by passing a gaseous mixture of hydrogen, steam, quinone vapor and the vapor of an organic solvent for quinone over a hydrogenation catalyst and partially condensing, after reaction, the steam with the hydroquinone formed.

MARCEL HANNION.
IGOR SCRIABINE.

REFERENCES CITED

The following references are of record in the file of this patent:

UNITED STATES PATENTS

| Number | Name | Date |
|---|---|---|
| 1,880,534 | Von Bramer | Oct. 4, 1932 |
| 1,998,177 | Bramer | Apr. 16, 1935 |

OTHER REFERENCES

Shibata, "Chemical Abstracts," vol. 30, 6276 (1936).

Sabatier et al., Comptes Rendus, vol. 146, page 457.

Feldman, Centralblatt, 1926, I, page 84.